United States Patent
Lee et al.

(10) Patent No.: US 12,540,984 B2
(45) Date of Patent: Feb. 3, 2026

(54) BATTERY PARAMETER SETTING APPARATUS AND METHOD

(71) Applicant: LG Energy Solution, Ltd., Seoul (KR)

(72) Inventors: Sun-Jong Lee, Daejeon (KR); Cheol-Taek Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 454 days.

(21) Appl. No.: 17/634,806

(22) PCT Filed: Mar. 9, 2021

(86) PCT No.: PCT/KR2021/002906
§ 371 (c)(1),
(2) Date: Feb. 11, 2022

(87) PCT Pub. No.: WO2021/194133
PCT Pub. Date: Sep. 30, 2021

(65) Prior Publication Data
US 2022/0276320 A1    Sep. 1, 2022

(30) Foreign Application Priority Data

Mar. 23, 2020    (KR) .......................... 10-2020-0035220

(51) Int. Cl.
*G01R 31/396* (2019.01)
*G01R 31/36* (2020.01)
(Continued)

(52) U.S. Cl.
CPC ....... *G01R 31/396* (2019.01); *G01R 31/3648* (2013.01); *G01R 31/367* (2019.01); *G01R 31/374* (2019.01); *G01R 31/3842* (2019.01)

(58) Field of Classification Search
None
See application file for complete search history.

(56) References Cited

U.S. PATENT DOCUMENTS

2013/0138370 A1    5/2013    Oh et al.
2014/0303915 A1    10/2014   Jo et al.
(Continued)

FOREIGN PATENT DOCUMENTS

EP    3627167 A1    3/2020
JP    2004-079472 A    3/2004
(Continued)

OTHER PUBLICATIONS

Extended European Search Report dated Oct. 11, 2022, issued by the European Patent Office in corresponding European Patent Application No. 21774563.7.
(Continued)

*Primary Examiner* — Matthew G Marini
(74) *Attorney, Agent, or Firm* — Morgan, Lewis & Bockius LLP

(57) ABSTRACT

The present disclosure is directed to a battery parameter setting apparatus and method, which may quickly generate and set a battery parameter most suitable for an equivalent circuit model from battery information without going through a separate experiment such as a HPPC experiment. According to one aspect of the present disclosure, there is an advantage that a battery parameter of an equivalent circuit model more suitable for a current state of a battery may be set.

13 Claims, 8 Drawing Sheets

(51) Int. Cl.
    *G01R 31/367*     (2019.01)
    *G01R 31/374*     (2019.01)
    *G01R 31/3842*     (2019.01)

(56) References Cited

U.S. PATENT DOCUMENTS

| | | |
|---|---|---|
| 2015/0051853 A1 | 2/2015 | Baba et al. |
| 2016/0033582 A1 | 2/2016 | You et al. |
| 2016/0187429 A1 | 6/2016 | Kawai et al. |
| 2018/0348307 A1* | 12/2018 | Chow .................. G06F 30/367 |
| 2020/0081066 A1 | 3/2020 | Ahn |
| 2020/0182939 A1 | 6/2020 | Ahn |

FOREIGN PATENT DOCUMENTS

| | | |
|---|---|---|
| JP | 2017-069011 A | 4/2017 |
| JP | 2019-175544 A | 10/2019 |
| KR | 10-2008-0023934 A | 3/2008 |
| KR | 10-0884530 B1 | 2/2009 |
| KR | 10-2012-0082965 A | 7/2012 |
| KR | 10-1547006 B1 | 8/2015 |
| KR | 10-2016-0014940 A | 2/2016 |
| KR | 10-1863036 B1 | 6/2018 |
| KR | 10-2019-0050169 A | 5/2019 |
| KR | 10-2019-0093409 A | 8/2019 |
| KR | 10-2019-0095754 A | 8/2019 |
| KR | 10-1996943 B1 | 10/2019 |
| WO | 2019/151679 A1 | 8/2019 |

OTHER PUBLICATIONS

He Lin et al., "State of charge estimation by finite difference extended Kalman filter with HPPC parameters identification," Science China Technological Sciences, Science China Press, Heidelberg, vol. 63, No. 3, Dec. 13, 2019, pp. 410-421.

International Search Report issued in corresponding International Patent Application No. PCT/KR2021/002906 dated Jun. 21, 2021.

Office Action dated Feb. 5, 2025 issued in corresponding Korean Patent Application No. 10-2020-0035220. (Note: KR 10-2019-0050169 A cited in this KR Office Action was cited in prior IDS.).

\* cited by examiner

FIG. 6

| SOC Section  Temperature Section | 0% or above less than 5% | 5% or above less than 10% | 10% or above less than 15% | ...... | 90% or above less than 95% | 95% or above less than 100% |
|---|---|---|---|---|---|---|
| -40°C or above lower than -35°C | 0 | 0 | 0 | | 0 | 0 |
| -35°C or above lower than -30°C | 0 | 0 | 0 | | 1 | 1 |
| ...... | | | | | | |
| 55°C or above lower than 60°C | 1 | 1 | 1 | | 0 | 0 |

| Temperature Section \ SOC Section | 0% or above less than 5% | 5% or above less than 10% | 10% or above less than 15% | ...... | 90% or above less than 95% | 95% or above less than 100% |
|---|---|---|---|---|---|---|
| -40°C or above lower than -35°C | - | - | - | | - | - |
| -35°C or above lower than -30°C | - | - | - | | [R0, R1, C1]$_{90,-35}$ | [R0, R1, C1]$_{95,-35}$ |
| ...... | | | | | | |
| 55°C or above lower than 60°C | [R0, R1, C1]$_{0,55}$ | [R0, R1, C1]$_{5,55}$ | [R0, R1, C1]$_{10,55}$ | | - | - |

BATTERY PARAMETER SETTING APPARATUS AND METHOD

TECHNICAL FIELD

The present application claims priority to Korean Patent Application No. 10-2020-0035220 filed on Mar. 23, 2020 in the Republic of Korea, the disclosures of which are incorporated herein by reference.

The present disclosure relates to a battery parameter setting apparatus and method, and more particularly, to a battery parameter setting apparatus and method for setting a battery parameter required for an equivalent circuit model.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, in order to estimate the SOC (State of Charge) of the battery, an extended Kalman filter-based estimation is widely used, and the extended Kalman filter includes a battery voltage estimation process based on an equivalent circuit model.

In order to estimate the battery voltage based on an equivalent circuit model, values such as R0, R1 and C1 called battery parameters are required, and these values may change depending on temperature and SOC of the battery.

Therefore, in the prior art, in order to obtain these battery parameters, HPPC (Hybrid Pulse Power Characterization) experiments were performed for temperature and SOC individually, and the battery parameters were estimated from the experimental results. In particular, in the prior art, primary battery parameters were extracted by performing HPPC experiments for battery temperature and SOC individually, and the primary battery parameters were tuned using a driving pattern, which is an actual driving pattern, to determine final battery parameters.

However, this conventional battery parameter determination method takes a long time to perform the determination, and in reality, it is difficult to accurately control the experimental conditions.

DISCLOSURE

Technical Problem

The present disclosure is designed to solve the problems of the related art, and therefore the present disclosure is directed to providing a battery parameter setting apparatus and method, which may quickly set a battery parameter most suitable for an equivalent circuit model from battery information without going through a separate experiment such as a HPPC experiment.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery parameter setting apparatus for setting a battery parameter of an equivalent circuit model, comprising: a battery information obtaining unit configured to obtain battery information including voltage, current, temperature and SOC (State Of Charge) of a battery according to time; a segment unit configured to distinguish the battery information obtained by the battery information obtaining unit into a plurality of segments and classify the plurality of distinguished segments; and a processor configured to select a target temperature section among a plurality of preset temperature sections, select at least one target segment corresponding to the target temperature section among the plurality of classified segments, calculate a reference predicted value for the target segment based on a reference parameter preset to correspond to the target segment and battery information of the target segment, generate a candidate parameter based on the reference parameter and a plurality of factors arbitrarily selected within a preset range, calculate a candidate predicted value for the target segment based on the candidate parameter and the battery information of the target segment, and set the battery parameter as the reference parameter or the candidate parameter according to a result of comparing the calculated reference predicted value with the calculated candidate predicted value.

The segment unit may be configured to distinguish the battery information into the plurality of segments according to a predetermined time interval and classify the plurality of distinguished segments according to temperature and SOC.

The segment unit may be configured to classify the plurality of segments such that one segment belongs to the same temperature section and the same SOC section.

The processor may be configured to select a temperature section in which the number of classified segments is equal to or greater than a predetermined number as the target temperature section.

The reference parameter may be a battery parameter preset in a temperature section to which temperature of the target segment belongs and in a SOC section to which SOC of the target segment belongs.

The processor may be configured to calculate a reference predicted voltage as the reference predicted value by using the current and the SOC of the target segment and the reference parameter.

The processor may be configured to calculate a candidate predicted voltage as the candidate predicted value by using the current and the SOC of the target segment and the candidate parameter.

The processor may be configured to calculate a reference voltage error through a difference between the voltage of the target segment and the calculated reference predicted voltage, calculate a candidate voltage error through a difference between the voltage of the target segment and the calculated candidate predicted voltage, and set the battery parameter as the candidate parameter when the calculated candidate voltage error is less than the calculated reference voltage error.

The processor may be configured to generate the candidate parameter only when the calculated reference voltage error is equal to or greater than a preset reference error.

The processor may be configured to regenerate a candidate parameter based on the set battery parameter and a plurality of factors arbitrarily reselected within the preset range, recalculate a candidate voltage error based on the regenerated candidate parameter, and update the set battery parameter according to a result of comparing the recalculated candidate voltage error with a voltage error corresponding to the set battery parameter, until a predetermined condition is satisfied after setting the battery parameter.

A battery pack according to another aspect of the present disclosure may comprise the battery parameter setting apparatus according to an aspect of the present disclosure.

A vehicle according to another aspect of the present disclosure may comprise the battery parameter setting apparatus according to an aspect of the present disclosure.

In another aspect of the present disclosure, there is provided a battery parameter setting method for setting a battery parameter of an equivalent circuit model, comprising: a battery information obtaining step of obtaining battery information including voltage, current, temperature and SOC of a battery according to time; a segment classification step of distinguishing the obtained battery information into a plurality of segments and classifying the plurality of distinguished segments; a target temperature selection step of selecting a target temperature section among a plurality of preset temperature sections; a target segment selection step of selecting at least one target segment corresponding to the target temperature section among the plurality of classified segments; a reference predicted value calculation step of calculating a reference predicted value for the target segment based on a reference parameter preset to correspond to the target segment and battery information of the target segment; a candidate parameter generation step of generating a candidate parameter based on the reference parameter and a plurality of factors arbitrarily selected within a preset range; a candidate predicted value calculation step of calculating a candidate predicted value for the target segment based on the candidate parameter and the battery information of the target segment; and a battery parameter setting step of setting the battery parameter as the reference parameter or the candidate parameter according to a result of comparing the calculated reference predicted value with the calculated candidate predicted value.

Advantageous Effects According to one aspect of the present disclosure, there is an advantage that a battery parameter of an equivalent circuit model may be set by more accurately reflecting a current state of a battery.

In addition, according to one aspect of the present disclosure, since a battery parameter may be generated based on battery information about voltage, current, temperature and SOC, a separate experiment such as a HPPC experiment is not required. Therefore, there is an advantage that the battery parameter may be set more quickly and accurately.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 6 is a diagram schematically showing a segment classification table used by the battery parameter setting apparatus according to an embodiment of the present disclosure.

FIG. 7 is a diagram schematically showing a reference parameter table 300 used by the battery parameter setting apparatus according to an embodiment of the present disclosure.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
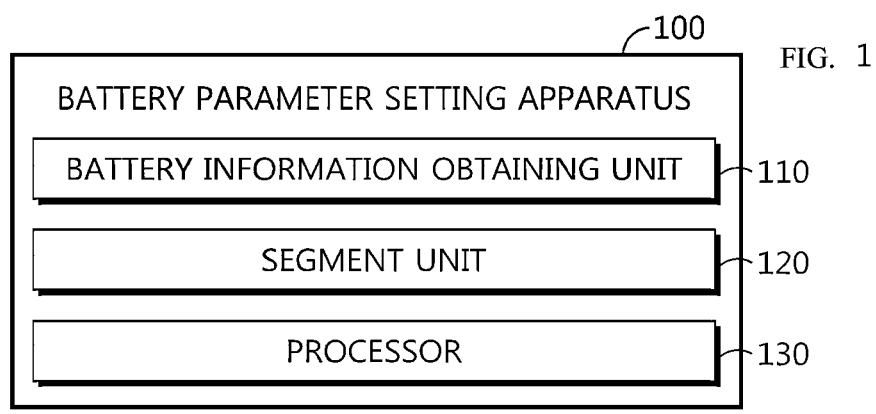
FIG. 1 is a diagram schematically showing a battery parameter setting apparatus according to an embodiment of the present disclosure.
Figure 2:
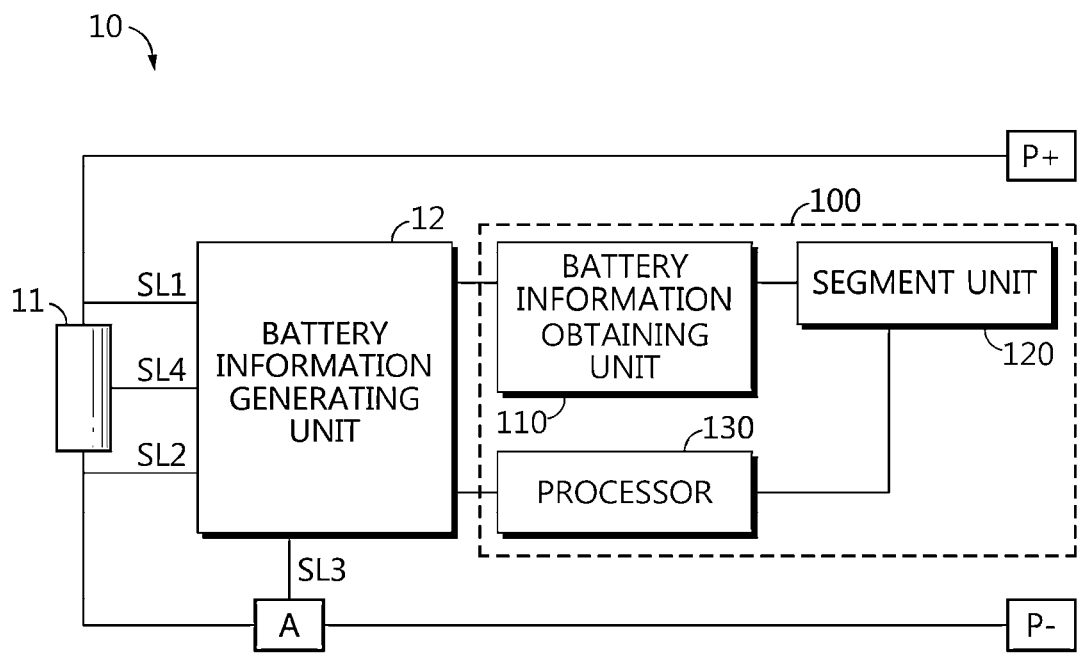
FIG. 2 is a diagram showing an exemplary configuration of a battery pack including the battery parameter setting apparatus according to an embodiment of the present disclosure.

FIG. 1 is a diagram schematically showing a battery parameter setting apparatus 100 according to an embodiment of the present disclosure. FIG. 2 is a diagram showing an exemplary configuration of a battery pack 10 including the battery parameter setting apparatus 100 according to an embodiment of the present disclosure.

The battery parameter setting apparatus 100 according to an embodiment of the present disclosure is a device capable of setting a battery parameter required for an equivalent circuit model.

Figure 3:
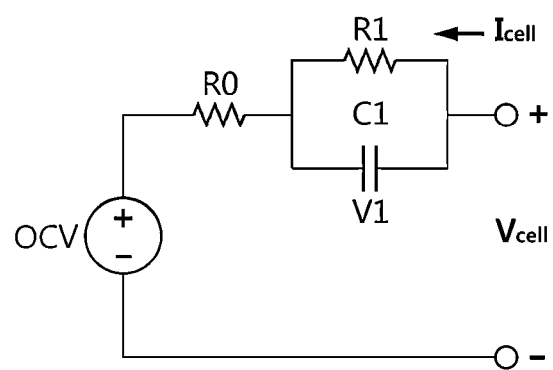
FIG. 3 is a diagram showing an exemplary configuration of an equivalent circuit model.

FIG. 3 is a diagram showing an exemplary configuration of the equivalent circuit model. Specifically, the equivalent circuit model of FIG. 3 may be a primary RC equivalent circuit model.

For example, in FIG. 3, the equivalent circuit model may include a voltage source having an OCV of OCV [V], a first resistor having a resistance of R0 [Ω], a second resistor having a resistance of R1 [Ω], and a capacitor having a capacitance of C1 [F]. In addition, the battery parameters of the equivalent circuit model may include the resistance R0 [Ω] of the first resistor, the resistance R1 [Ω] of the second resistor, and the capacitance C1 [F] of the capacitor.

Hereinafter, for convenience of explanation, it will be described that the battery parameter setting apparatus 100 estimates and sets a battery parameter for the primary RC equivalent circuit model of FIG. 3. However, in the following description, it should be noted that the battery parameter setting apparatus 100 is not limited to estimating only the battery parameter of the primary RC equivalent circuit model. That is, the battery parameter setting apparatus 100 may also be configured to estimate and set a battery parameter of a secondary or higher RC equivalent circuit model.

Referring to FIGS. 1 and 2, the battery parameter setting apparatus 100 may include a battery information obtaining unit 110, a segment unit 120, and a processor 130.

The battery information obtaining unit 110 may be configured to obtain battery information including voltage, current, temperature and SOC (State Of Charge) of a battery 11 according to time.

Here, the battery 11 may be a battery cell or a battery module. The battery cell may mean one independent cell that includes a negative electrode terminal and a positive electrode terminal and is physically separable. For example, one pouch-type lithium polymer cell may be regarded as a battery cell. Also, the battery module may mean a cell assembly in which one or more battery cells are connected in series and/or in parallel.

Specifically, the voltage, current and temperature of the battery 11 may be measured for each cycle. In addition, the SOC of the battery 11 may be estimated based on at least one of the measured voltage, current and temperature.

For example, in the embodiment of FIG. 2, a battery information generating unit 12 may be electrically connected to the battery 11. The battery information generating unit 12 may measure a voltage of the battery 11 through a first sensing line SL1 and a second sensing line SL2.

In addition, the battery information generating unit 12 may be connected to a current measuring element A provided on a charging and discharging path of the battery 11 through a third sensing line SL3. Also, the battery information generating unit 12 may measure a current flowing in the charging and discharging path through the current measuring element A. Here, the charging and discharging path is a path connected to a positive electrode terminal P+ of the battery pack 10, the battery 11, and a negative electrode terminal P− of the battery pack 10, and may be a high current path of the battery 11.

In addition, the battery information generating unit 12 may measure a temperature of the battery 11 through a fourth sensing line SL4.

In addition, the battery information generating unit 12 may estimate a SOC of the battery 11 based on at least one of the measured voltage, current and temperature of the battery 11.

In addition, the battery information generating unit 12 and the battery information obtaining unit 110 may be communicatively connected. That is, the battery information obtaining unit 110 may obtain the battery information including voltage, current, temperature and SOC of the battery 11 from the battery information generating unit 12.

Figure 4:
FIG. 4 is a diagram exemplarily showing the battery information obtained by the battery parameter setting apparatus according to an embodiment of the present disclosure.

FIG. 4 is a diagram exemplarily showing the battery information obtained by the battery parameter setting apparatus 100 according to an embodiment of the present disclosure.

Referring to FIG. 4, the battery information obtaining unit 110 may obtain battery information including voltage, current, temperature and SOC of the battery 11.

The segment unit 120 may be communicatively connected to the battery information obtaining unit 110.

The segment unit 120 may be configured to distinguish the battery information obtained by the battery information obtaining unit 110 into a plurality of segments.

Specifically, the segment unit 120 may distinguish voltage, current, temperature and SOC included in the battery information at each preset predetermined time interval. Here, the predetermined time interval may be a time interval exceeding 0 second. For example, the predetermined time interval may be 30 seconds.

Figure 5:
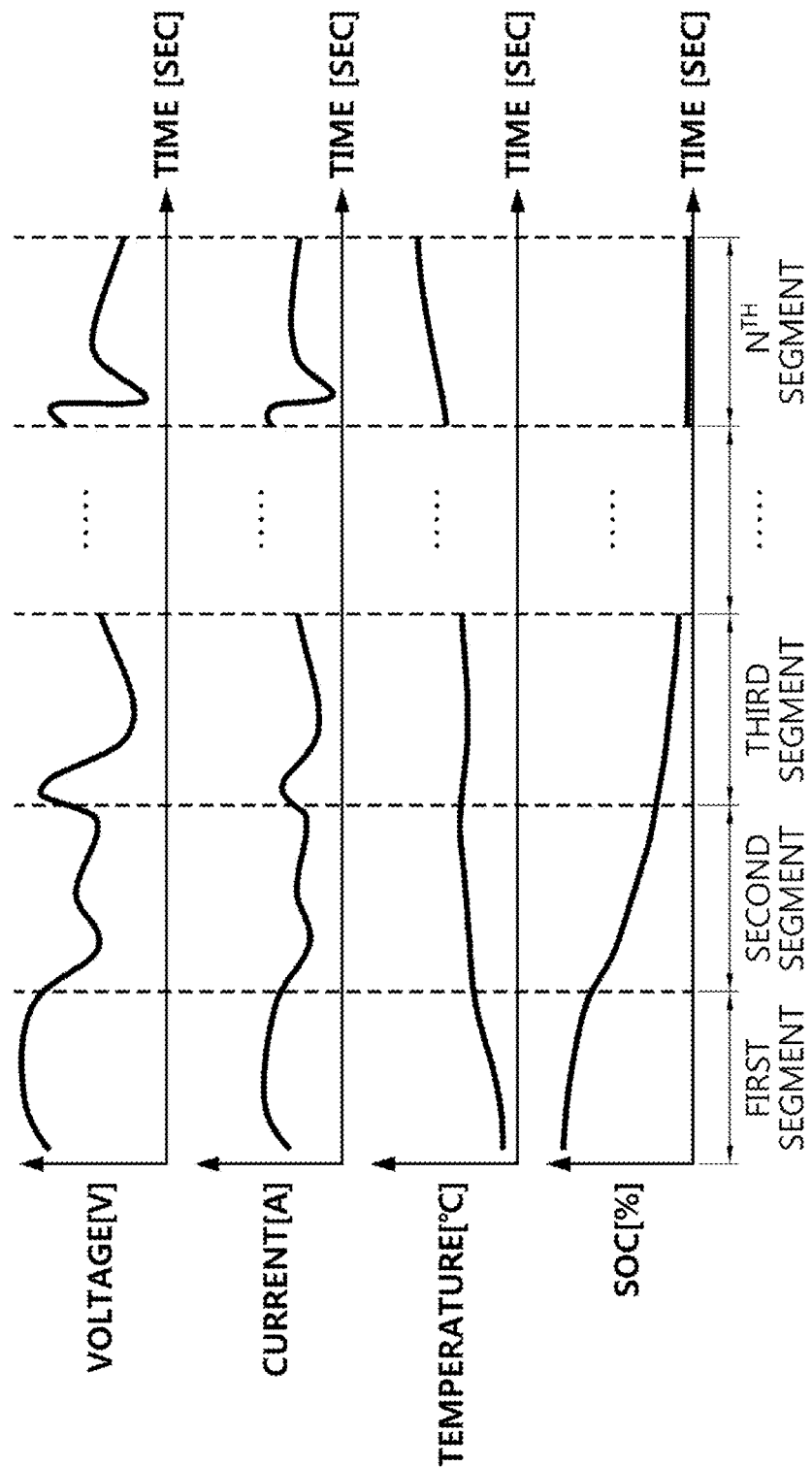
FIG. 5 is a diagram exemplarily showing a plurality of segments classified by the battery parameter setting apparatus according to an embodiment of the present disclosure.

FIG. 5 is a diagram exemplarily showing a plurality of segments classified by the battery parameter setting apparatus 100 according to an embodiment of the present disclosure.

For example, in the embodiment of FIG. 5, the segment unit 120 may distinguish the battery information at intervals of 30 seconds so that the battery information is distinguished into an N number of segments. That is, the first segment includes a measured voltage, a measured current and a measured temperature measured for a time from 0 second to 30 seconds, and a SOC estimated based thereon. Similarly, the second segment includes a measured voltage, a measured current and a measured temperature measured voltage for a time from 31 seconds to 60 seconds, and a SOC estimated based thereon.

As another example, the battery information obtaining unit 110 may periodically receive the voltage, current, temperature and SOC of the battery 11 from the battery information generating unit 12. In addition, the segment unit 120 may distinguish the battery information received by the battery information obtaining unit 110 into segments. For example, the segment unit 120 may distinguish the battery information received by the battery information obtaining unit 110 into segments at intervals of 30 seconds.

The segment unit 120 may be configured to classify the plurality of distinguished segments.

Preferably, the segment unit 120 may be configured to classify the plurality of distinguished segments according to temperature and SOC. For example, the segment unit 120 may classify the plurality of segments so that one segment is included for one temperature section and one SOC section.

FIG. 6 is a diagram schematically showing a segment classification table 200 used by the battery parameter setting apparatus 100 according to an embodiment of the present disclosure.

Referring to FIG. 6, the segment classification table 200 may be distinguished according to an SOC section and a temperature section. The segment unit 120 may classify the plurality of segments according to temperature and SOC by using the segment classification table 200 of FIG. 6. Here, FIG. 6 shows an example of the segment classification table 200, and a total range of the temperature section and the SOC section of the segment classification table 200 and a size of one section may be variously applied.

The processor 130 may be configured to select a target temperature section from among a plurality of preset temperature sections.

Specifically, the processor 130 may select a temperature section in which the number of classified segments is equal to or greater than a predetermined number, as the target temperature section among the plurality of temperature sections.

For example, in the embodiment of FIG. 6, it is assumed that the number of segments classified to be included in a temperature section of 55 [° C.] or above and lower than 60 [° C.] is equal to or greater than a predetermined number. The processor 130 may select the temperature section of 55 [° C.] or above and lower than 60 [° C.] as the target temperature section.

The processor 130 may be configured to select at least one target segment corresponding to the target temperature section, among the plurality of classified segments.

Specifically, the processor 130 may select a plurality of classified segments as the target segment to be included in the target temperature section.

For example, as in the former embodiment, if the processor 130 selects the temperature section of 55 [° C.] or above and lower than 60 [° C.] as the target temperature section, the processor 130 may select a plurality of classified segments in the temperature section of 55 [° C.] or above and lower than 60 [° C.] as the target segment.

The processor 130 may be configured to calculate a reference predicted value for the target segment based on a reference parameter preset to correspond to the target segment and the battery information of the target segment.

Specifically, the reference parameter may be a battery parameter preset to correspond to the temperature and SOC of the target segment. That is, the reference parameter may be a battery parameter preset in the temperature section to which the temperature of the target segment belongs and the SOC section to which the SOC of the target segment belongs.

For example, in the embodiment of FIG. 6, the reference parameter may be preset for the temperature section and the SOC section. That is, for the temperature section of 55 [° C.] or above and lower than 60 [° C.], the reference parameter may be preset in each of the SOC section of 0 [%] or more and less than 5 [%] and the SOC section of 5 [%] or more and less than 10 [%].

FIG. 7 is a diagram schematically showing a reference parameter table 300 used by the battery parameter setting apparatus 100 according to an embodiment of the present disclosure.

Referring to FIG. 7, the reference parameter table 300 may be set according to the temperature section and the SOC section.

For example, for a segment belonging to the SOC section having an SOC of 0 [%] or more and less than 5 [%] and the temperature section having a temperature of 55 [° C.] or above and lower than 60 [° C.], [R0, R1, C1]$_{0,55}$ may be preset as the reference parameter.

The processor 130 may calculate a reference predicted value for the target segment based on the corresponding reference parameter, current and SOC for each target segment.

Specifically, the processor 130 may calculate the reference predicted value of the target segment using Equation 1 below.

$$Vcell[k] = OCV[k] + (Icell[k] \times R0) + V1[k]$$ [Equation 1]

Referring to the equivalent circuit model of FIG. 3, k means a time point, and Vcell is a reference predicted value. In addition, OCV is the OCV of the equivalent circuit model, and R0 is the battery parameter corresponding to the target segment. Also, V1 is the voltage calculated by the battery parameters (R1 and C1) corresponding to the target segment. Icell is a current, and the direction of Icell is a current direction.

Specifically, the processor 130 may estimate the OCV (Open Circuit Voltage) from the SOC of the battery 11. Also, the processor 130 may calculate V1 based on R1 and C1 among the battery parameters.

That is, the processor 130 may calculate a reference predicted value (Vcell) of each target segment based on the battery parameters (R0, R1, C1), the SOC, the current (Icell), and the temperature.

The processor 130 may be configured to generate a candidate parameter based on the reference parameter and a plurality of factors arbitrarily selected within a preset range.

Here, the candidate parameter may be a battery parameter estimated by the processor 130 for each target segment. Specifically, the processor 130 may generate a candidate parameter by using Equations 2 to 5 below.

$$R0' = a_0 \times R0 + b_0$$ [Equation 2]

Here, R0' is a candidate parameter generated by the processor 130, and R0 is a reference parameter. $a_0$ and $b_0$ are factors arbitrarily selected to calculate the candidate parameter (R0').

$$R1' = a_1 \times R1 + b_1$$ [Equation 3]

Here, R1' is a candidate parameter generated by the processor 130, and R1 is a reference parameter. $a_1$ and $b_1$ are factors arbitrarily selected to calculate the candidate parameter (R1').

$$C1' = \frac{c_1 \tau_1}{R1'}$$ [Equation 4]

Here, C1' is a candidate parameter generated by the processor 130, and $c_1$ and $\tau_1$ are factors arbitrarily selected to calculate the candidate parameter (C1').

Specifically, $a_0$, $a_1$ and $c_1$ may be arbitrarily selected in a range greater than 0.99 and less than 1.01. $\tau_1$ is a time variable for calculating the capacitance (C1') and is a variable that may be randomly selected in the unit of 1 [sec] from more than 0 [sec] to 10800 [sec] or less.

$b_i$ ($b_0$ and $b_1$) may be arbitrarily selected using Equation 5 below.

$$-0.01 \times Ri(T, SOC=50\%) < b_i < 0.01 \times Ri(T, SOC=50\%)$$ [Equation 5]

Here, T is the temperature of the target segment. Specifically, T is an average temperature of the target segment. Ri(T, SOC=50%) is a reference parameter corresponding to the SOC section of 50 [%] or more and less than 55 [%] in the same temperature section as the temperature of the target segment.

For example, assuming that the temperature of the target segment is included in a temperature section of 55 [° C.] or above and lower than 60 [° C.], T may correspond to the temperature section of 55 [° C.] or above and lower than 60 [° C.]. In this case, R0(T, SOC=50%) is a reference parameter (R0) corresponding to the temperature section of 55 [° C.] or above and lower than 60 [° C.] and the SOC section of 50 [%] or more and less than 55 [%]. Similarly, R1(T, SOC=50%) is a reference parameter (R1) corresponding to the temperature section of 55 [° C.] or above and lower than 60 [° C.] and the SOC section of 50 [%] or more and less than 55 [%].

The processor 130 may be configured to calculate a candidate predicted value for the target segment based on the candidate parameter and the battery information of the target segment.

That is, after generating a candidate parameter by using Equations 2 to 5, the processor 130 may calculate a candidate predicted value for the target segment based on the candidate parameter and the battery information of the target segment by using Equation 1.

In addition, the processor 130 may be configured to set the battery parameter as the reference parameter or the candidate parameter according to a result of comparing the calculated reference predicted value with the calculated candidate predicted value.

Specifically, the processor 130 may compare the size between the calculated reference predicted value and the calculated candidate predicted value, and set the battery parameter as the reference parameter or the candidate parameter according to the comparison result.

For example, if the reference predicted value exceeds the candidate predicted value, the battery parameter may be set as the candidate parameter. That is, the battery parameter corresponding to the target segment may be updated as the candidate parameter to correspond to the temperature and SOC of the target segment.

As another example, if the reference predicted value is less than or equal to the candidate predicted value, the battery parameter may be set as the reference parameter. That is, the battery parameter of the target segment is not updated and may be maintained as the reference parameter.

The battery parameter setting apparatus 100 may update the battery parameter only when a sufficient data set (target segment) for updating the battery parameter is secured. Accordingly, the estimation accuracy of the battery parameter for the equivalent circuit model may be improved.

In addition, according to the battery parameter setting apparatus 100, since a battery parameter may be set based on the battery information, a separate experiment such as a HPPC experiment is not required. Therefore, there is an advantage that battery parameters may be set more quickly and accurately based on the battery information.

Meanwhile, the processor 130 provided to the battery parameter setting apparatus 100 may selectively include processors 130 known in the art, application-specific integrated circuit (ASIC), other chipsets, logic circuits, registers, communication modems, data processing devices, and the like to execute various control logic performed in the present disclosure. Also, when the control logic is implemented in software, the processor 130 may be implemented as a set of program modules. At this time, the program module may be stored in a memory and executed by the processor 130. The memory may be located inside or out of the processor 130 and may be connected to the processor 130 by various well-known means.

The segment unit 120 may be configured to classify the plurality of segments so that one segment belongs to the same temperature section and the same SOC section.

For example, the temperature and SOC of the segment to be classified may be not evenly distributed, and the majority of segments may be biased and classified in any one SOC section and any one temperature section. In this case, there is a problem that the diversity of specimens (segments to be selected) is not guaranteed because the classified segments are not evenly distributed. Furthermore, since the diversity of specimens is not guaranteed, the reliability of the estimated battery parameters may be lowered.

Accordingly, the segment unit 120 may limit a maximum allowable number of segments classified to the same temperature section and the same SOC in order to secure the diversity of segments to be selected.

For example, FIG. 6 shows an embodiment in which the segment unit 120 sets the maximum allowable number of segments classified to the same temperature section and the same SOC as one. In the embodiment of FIG. 6, a segment can no longer be classified to a section in which the number of segments already selected is 1.

In addition, the segment unit 120 may be configured to select only segments in which a charge C-rate and a discharge C-rate of the battery 11 are included in a predetermined C-rate section.

For example, the segment unit 120 may select and classify only segments included in a C-rate section in which the charge and discharge C-rates of the battery 11 are greater than 0.1 and less than 0.3.

That is, the segment unit 120 may limit the charge and discharge C-rates of the segment to be classified within a certain range so that the selected segment includes battery information under similar charge and discharge conditions. Therefore, by the segment classified in this way, the accuracy of the battery parameter for the equivalent circuit model may be improved.

The processor 130 may be configured to select a temperature section in which the number of classified segments is equal to or greater than a predetermined number as the target temperature section.

For example, the processor 130 may select a temperature section having 10 or more classified segments as the target temperature section.

It is assumed that the battery information obtaining unit 110 obtains the generated battery information whenever the battery information generating unit 12 generates battery information. In this case, if the segment classified by the segment unit 120 is classified for the same temperature section for the $10^{th}$ time, the processor 130 may select the corresponding temperature section as the target temperature section and generate a battery parameter corresponding to the target segment of the target temperature section.

Since the processor 130 selects a temperature section in which a predetermined number or more of segments are classified as the target temperature section, overfitting of the generated battery parameters may be prevented. That is, if the number of segments included in the same temperature section is not considered in the process of selecting the target temperature section, there is a problem that a battery parameter suitable only for a specific temperature section can be estimated for all temperature sections.

Accordingly, the processor 130 may improve the estimation accuracy of the battery parameter by selecting a temperature section in which a predetermined number or more of segments are classified as the target temperature section.

The processor 130 may be configured to calculate a reference predicted voltage as the reference predicted value by using the current and the SOC of the target segment and the reference parameter.

For example, referring to Equation 1, the processor 130 may calculate a reference predicted voltage at a time point k based on the OCV based on the SOC of the target segment, the voltage (V1) calculated based on the reference parameters (R1, C1), the reference parameter (R0), and the current (Icell).

However, the processor 130 not only calculates the reference predicted voltage as the reference predicted value and but also may calculate a reference predicted current as the reference predicted value by using Equation 1. However, hereinafter, for convenience of explanation, it will be described that the processor 130 calculates a predicted voltage as the predicted value.

The processor 130 may be configured to calculate a candidate predicted voltage as the candidate predicted value by using the current and the SOC of the target segment and the candidate parameter.

The processor 130 may calculate the candidate predicted voltage by using Equation 6 below.

$$Vcell'[k]=OCV[k]+(Icell[k]\times R0')+V1'[k] \quad \text{[Equation 6]}$$

Referring to the equivalent circuit model of FIG. 3, k means a time point, and Vcell' is a candidate predicted voltage. In addition, OCV is an OCV based on the SOC of the target segment, and R0' is a candidate parameter corresponding to the target segment. In addition, V1' is a candidate predicted voltage calculated based on the candidate parameters (R1' and C1') corresponding to the target segment. Icell is a current, and the direction of Icell is a current direction.

The processor 130 may be configured to calculate a reference voltage error based on a difference between the voltage of the target segment and the calculated reference predicted voltage.

That is, the processor 130 may calculate the reference voltage error by calculating the difference between the reference predicted voltage (Vcell) calculated for the target segment by using Equation 1 and an average voltage of the target segments. Preferably, the processor 130 may calculate the reference voltage error by using the formula "reference predicted voltage−average voltage".

In addition, the processor 130 may be configured to calculate a candidate voltage error based on a difference between the voltage of the target segment and the calculated candidate predicted voltage.

That is, the processor 130 may calculate the candidate voltage error by obtaining the difference between the candidate predicted voltage (Vcell') calculated for the target segment by using Equation 6 and the average voltage of the target segments. Preferably, the processor 130 may calculate the candidate voltage error by using the formula "candidate predicted voltage−average voltage".

The processor 130 may be configured to set the battery parameter as the candidate parameter if the calculated candidate voltage error is less than the calculated reference voltage error.

That is, if the candidate voltage error is smaller than the reference voltage error, the processor 130 may update the battery parameter as the candidate parameter. Conversely, if the candidate voltage error is equal to or greater than the reference voltage error, the processor 130 may maintain the battery parameter as the reference parameter without updating the battery parameter as the candidate parameter.

Here, the case where the voltage error is smaller refers to a case where the predicted voltage calculated based on the battery parameter is more similar to an actual voltage. Accordingly, if the candidate voltage error calculated based on a newly generated candidate parameter is smaller than the reference voltage error calculated based on the preset reference parameter, the processor 130 may update the battery parameter as the candidate parameter.

That is, the battery parameter setting apparatus 100 according to an embodiment of the present disclosure has an advantage of updating the battery parameter more suitably for each target segment by reflecting a present state of the battery 11 more accurately.

The processor 130 may be configured to generate the candidate parameter only when the calculated reference voltage error is equal to or greater than the preset reference error.

Here, the reference error may be an index for determining whether it is necessary to update the reference parameter presently set for the target segment. That is, if the reference voltage error is greater than or equal to the reference error, it may be required to update the battery parameter because the reference parameter does not reflect a present state of the battery 11 more accurately.

Accordingly, the processor 130 may generate the candidate parameter by using Equations 2 to 5 only when the reference voltage error is equal to or greater than the reference error. Furthermore, the processor 130 may set the battery parameter as the reference parameter or the candidate parameter according to a result of comparing the reference predicted value with the candidate predicted value.

Here, if the battery parameter is set as the candidate parameter, the battery parameter may be updated to a parameter more suitable for the present state of the battery 11. Therefore, the equivalent circuit model may more accurately reflect the state of battery 11.

The processor 130 may be configured to regenerate a candidate parameter based on the set battery parameter and a plurality of factors arbitrarily reselected within the preset range, until a predetermined condition is satisfied after setting the battery parameter.

In addition, the processor 130 may be configured to recalculate a candidate voltage error based on the regenerated candidate parameter.

Finally, the processor 130 may be configured to update the set battery parameter according to a result of comparing the recalculated candidate voltage error with a voltage error corresponding to the set battery parameter.

Specifically, first, the processor 130 may randomly reselect a plurality of factors used in Equations 2 to 5. The processor 130 may regenerate candidate parameters (R0', R1', C1') based on the plurality of reselected factors.

In addition, the processor 130 may calculate a reference voltage error (Vcell) by using Equation 1, and recalculate a candidate voltage error (Vcell') corresponding to the regenerated candidate parameters (R0', R1', C1') by using Equation 6.

Finally, the processor 130 may compare the size between the reference voltage error (Vcell) and the candidate voltage error (Vcell'), and set the battery parameter as the reference parameter (R0, R1, C1) or the candidate parameter (R0', R1 ', Cr) according to the comparison result. For example, only when the reference voltage error (Vcell) exceeds the candidate voltage error (Vcell'), the processor 130 may set the battery parameter as the candidate parameter (R0', R1', C1').

Even if the processor 130 does not update the battery parameter to the candidate parameter (R0', R1', C1'), the processor 130 may repeat the above process until the number of candidate parameter generation becomes equal to a predetermined number of times. For example, the predetermined number of times may be 100 times.

In this process, since a plurality of factors used to generate the candidate parameter are randomly selected within a predetermined range, as the number of repetitions increases, a more probabilistically suitable battery parameter may be set. Accordingly, the battery parameter setting apparatus 100 has an advantage of setting a more optimized battery parameter through repeatedly performing the process even if the battery parameter is updated.

In addition, the battery parameter setting apparatus 100 according to an embodiment of the present disclosure may be provided to a battery pack 10.

For example, in the embodiment of FIG. 2, the battery pack 10 according to the present disclosure may include the described battery parameter setting apparatus 100 described above and at least one battery 11. In addition, the battery pack 10 may further include electrical equipment (relays, fuses, etc.) and a case.

The battery parameter setting apparatus 100 according to the present disclosure may be applied to a BMS (Battery Management System). That is, the BMS according to the present disclosure may include the battery parameter setting apparatus 100 described above. In this configuration, at least some of the components of the battery parameter setting apparatus 100 may be implemented by supplementing or adding functions of components included in a conventional BMS. For example, the battery information obtaining unit 110, the segment unit 120 and the processor 130 of the battery parameter setting apparatus 100 may be implemented as components of the BMS. Here, an electronic system provided in the battery pack 10 to monitor the state of the battery 11 and control the charge and discharge of the battery 11 may be applied as the BMS.

The battery parameter setting apparatus 100 according to an embodiment of the present disclosure may be provided to a vehicle.

Specifically, the battery parameter setting apparatus 100 may be provided in the vehicle and set the battery parameter of the equivalent circuit model for the battery 11 provided in the vehicle based on driving pattern information of the vehicle (battery information including voltage, current, temperature and SOC of the battery 11).

That is, the battery parameter setting apparatus 100 may set a battery parameter most suitable for the equivalent circuit model based on the driving pattern information. Therefore, based on the equivalent circuit model in which the battery parameters are set, the degree of degradation of the battery 11 provided in the vehicle may be more accurately estimated.

Figure 8:
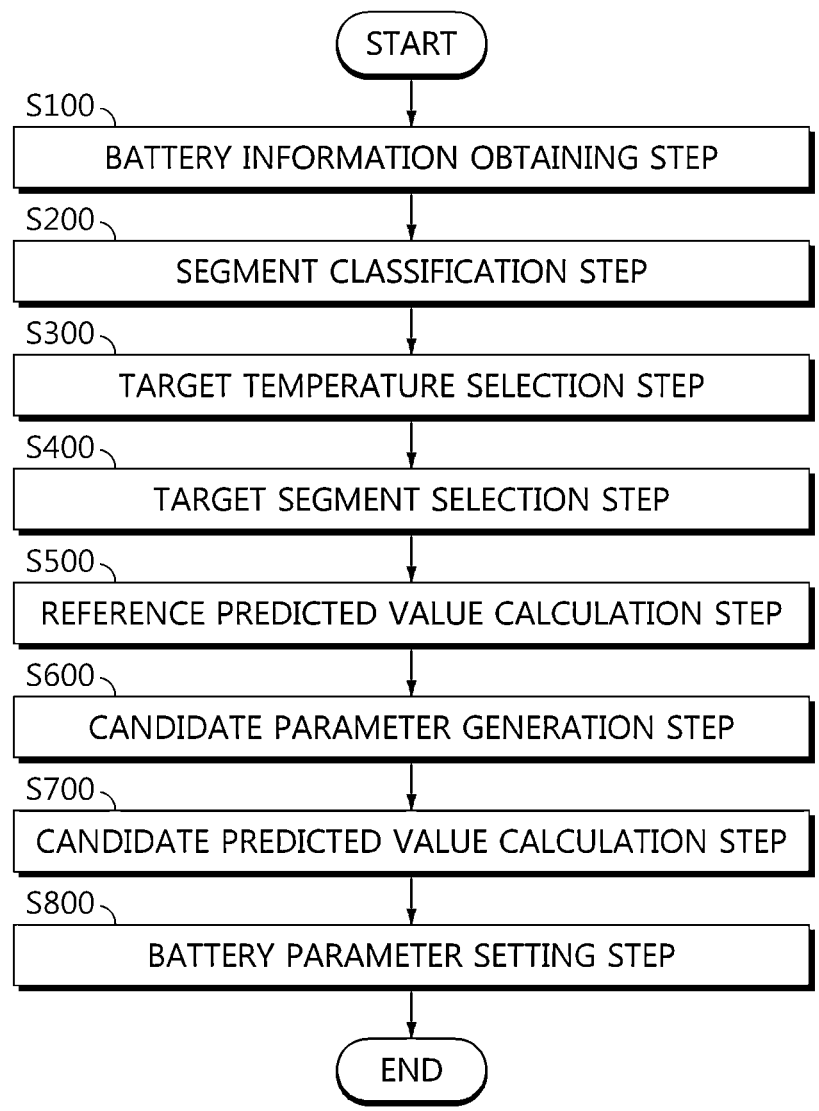
FIG. 8 is a diagram schematically showing a battery parameter setting method according to another embodiment of the present disclosure.

FIG. 8 is a diagram schematically showing a battery parameter setting method according to another embodiment of the present disclosure.

The battery parameter setting method is a method of setting a battery parameter of an equivalent circuit model, and may be performed by the battery parameter setting apparatus 100. Hereinafter, the battery parameter setting method will be described, but contents overlapping with the previously described contents will be briefly described.

A battery information obtaining step (S100) is a step of obtaining battery information including voltage, current, temperature and SOC of the battery 11 according to time, and may be performed by the battery information obtaining unit 110.

For example, in the embodiment of FIG. 2, the battery information generating unit 12 may measure voltage, current and temperature of the battery 11 and estimate the SOC of the battery 11. The battery information obtaining unit 110 may obtain the battery information including voltage, current, temperature and SOC of the battery 11 from the battery information generating unit 12.

A segment classification step (S200) is a step of distinguishing the obtained battery information into a plurality of segments and classifying the plurality of distinguished segments, and may be performed by the segment unit 120.

For example, in the embodiment of FIGS. 4 and 5, the segment unit 120 may distinguish the battery information into a plurality of segments at a predetermined time interval.

In addition, in the embodiment of FIG. 6, the segment unit 120 may classify the plurality of segments according to temperature and SOC. For example, the segment unit 120 may select and classify only charged and discharged segments within a predetermined C-rate range. In addition, the segment unit 120 may classify only one segment for the same temperature section and the same SOC section.

A target temperature selection step (S300) is a step of selecting a target temperature section among a plurality of preset temperature sections, and may be performed by the processor 130.

For example, in the embodiment of FIG. 6, the processor 130 may select a temperature section in which 10 or more segments are classified as the target temperature section, among the plurality of temperature sections.

A target segment selection step (S400) is a step of selecting at least one target segment corresponding to the target temperature section among the plurality of classified segments, and may be performed by the processor 130.

For example, referring to the former embodiment, 10 segments included in the target temperature section may be selected as the target segment.

A reference predicted value calculation step (S500) is a step of calculating a reference predicted value for the target segment based on a reference parameter preset to correspond to the target segment and the battery information of the target segment, and may be performed by the processor 130.

For example, in the embodiment of FIG. 7, the reference parameter corresponding to the temperature section and the SOC section may be preset. The processor 130 may calculate a reference predicted value based on the reference parameter set to correspond to the target segment and the battery information of the target segment. Preferably, the processor 130 may calculate the reference predicted voltage by using Equation 1.

A candidate parameter generation step (S600) is a step of generating a candidate parameter based on the reference parameter and a plurality of factors arbitrarily selected within a preset range, and may be performed by the processor 130.

For example, the processor 130 may generate a candidate parameter corresponding to each target segment by using Equations 2 to 5.

A candidate predicted value calculation step (S700) is a step of calculating a candidate predicted value for the target segment based on the candidate parameter and the battery information of the target segment, and may be performed by the processor 130.

The processor 130 may calculate a candidate predicted value based on the candidate parameter generated to correspond to the target segment and the battery information of the target segment. Preferably, the processor 130 may calculate the candidate predicted voltage by using Equation 6.

A battery parameter setting step (S800) is a step of setting the battery parameter as the reference parameter or the candidate parameter according to a result of comparing the calculated reference predicted value with the calculated candidate predicted value, and may be performed by the processor 130.

Preferably, the processor 130 may compare the size between a reference voltage error based on the reference predicted value and a candidate voltage error based on the candidate predicted value. Here, if the candidate voltage error is less than the reference voltage error, the processor 130 may set the candidate parameter as the battery parameter. Conversely, if the candidate voltage error is greater than or equal to the reference voltage error, the processor 130 may maintain the reference parameter as the battery parameter.

Meanwhile, preferably, in the reference predicted value calculation step (S500), the processor 130 may calculate the reference voltage error based on the reference predicted voltage and an average voltage of the target segment. In addition, the processor 130 may perform the candidate parameter generation step (S600) only when the calculated reference voltage error is equal to or greater than the reference error.

That is, if the reference voltage error is greater than or equal to the reference error, this may be a case where a presently set reference parameter may not accurately reflect the state of the battery 11. Accordingly, in order to prevent excessive system load on the processor 130, the candidate parameter generation step (S600) may be performed only when the reference voltage error is equal to or greater than the reference error.

Figure 9:
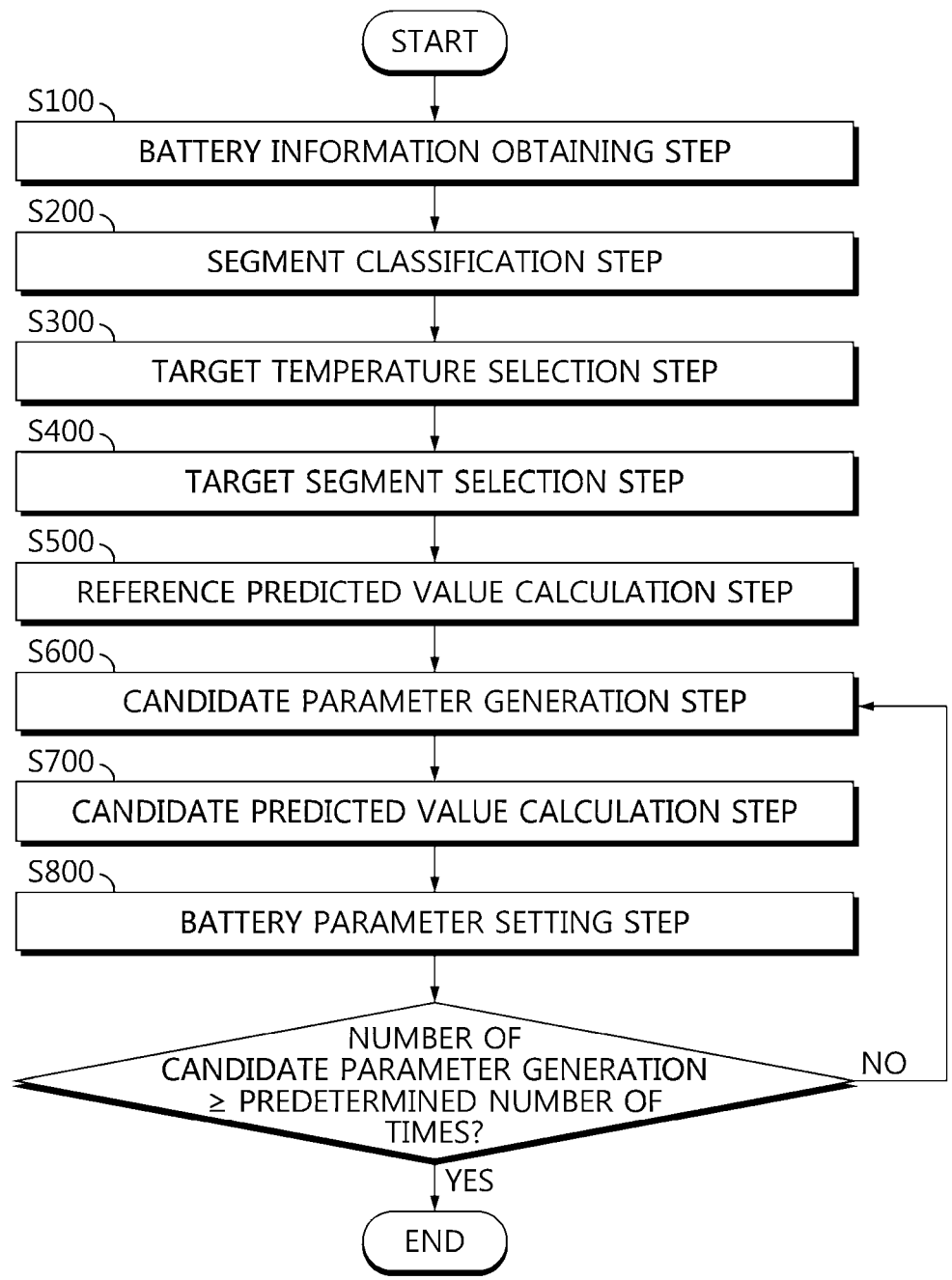
FIG. 9 is a diagram schematically showing a battery parameter setting method according to still another embodiment of the present disclosure.

FIG. 9 is a diagram schematically showing a battery parameter setting method according to still another embodiment of the present disclosure. Steps indicated by the same reference sign in FIGS. 8 and 9 may be the same step.

Referring to FIG. 9, the candidate parameter generation step (S600), the candidate predicted value calculation step (S700) and the battery parameter setting step (S800) may be repeatedly performed by a predetermined number of times.

For example, in the candidate parameter generation step (S600), a plurality of factors may be randomly selected within a predetermined range. As the candidate parameter is repeatedly generated, the probability of generating a candidate parameter that reflects a present state of the battery 11 better may increase. In addition, if the battery parameter is updated by the candidate parameter generated in this way, an equivalent circuit model more suitable for the battery 11 may be configured. Therefore, if this equivalent circuit model is used, the estimation accuracy for the SOC of the battery 11 may be remarkably improved.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery pack
11: battery
12: battery information generating unit
100: battery parameter setting apparatus
110: battery information obtaining unit
120: segment unit
130: processor
200: segment classification table
300: reference parameter table

What is claimed is:

1. A battery management system (BMS) having a battery parameter setting apparatus for setting a battery parameter of an equivalent circuit model for a battery, the BMS comprising:
    a battery information obtaining unit configured to obtain battery information, the battery information including voltage, current, temperature, and state of charge (SOC) of the battery according to time;
    a segment classifier configured to:
        distinguish the battery information obtained by the battery information obtaining unit into a plurality of segments; and
        classify the plurality of distinguished segments; and
    a processor configured to:
        select a target temperature section, among a plurality of preset temperature sections;
        select a target segment corresponding to the target temperature section, among the plurality of classified segments;
        calculate a reference predicted value for the target segment, based on a reference parameter preset to correspond to the target segment and battery information of the target segment;
        generate a candidate parameter, based on the reference parameter and a plurality of factors arbitrarily selected within a preset range;
        calculate a candidate predicted value for the target segment, based on the candidate parameter and the battery information of the target segment;
        set the battery parameter as the reference parameter or the candidate parameter, according to a result of comparing the calculated reference predicted value with the calculated candidate predicted value;
        determine an estimated voltage of the battery based on the equivalent circuit model having the set battery parameter; and
        monitor a state of the battery or control a charge and discharge of the battery based on a state of the battery estimated according to the estimated voltage of the battery.

2. The BMS according to claim 1, wherein the segment classifier is further configured to:

distinguish the battery information into the plurality of segments according to a predetermined time interval; and classify the plurality of distinguished segments according to temperature and SOC.

3. The BMS according to claim 2, wherein the segment classifier is further configured to classify the plurality of segments, such that one segment belongs to a same temperature section and a same SOC section.

4. The BMS according to claim 1, wherein the processor is further configured to select a temperature section in which the number of classified segments is equal to or greater than a predetermined number as the target temperature section.

5. The BMS according to claim 1, wherein the reference parameter is a battery parameter preset in a temperature section to which temperature of the target segment belongs and in an SOC section to which an SOC of the target segment belongs.

6. The BMS according to claim 1, wherein the processor is further configured to calculate a reference predicted voltage as the reference predicted value by using a current and an SOC of the target segment and the reference parameter.

7. The BMS according to claim 6, wherein the processor is further configured to calculate a candidate predicted voltage as the candidate predicted value by using the current and the SOC of the target segment and the candidate parameter.

8. The BMS according to claim 7, wherein the processor is further configured to:
calculate a reference voltage error through a difference between the voltage of the target segment and the calculated reference predicted voltage;
calculate a candidate voltage error through a difference between the voltage of the target segment and the calculated candidate predicted voltage; and
set the battery parameter as the candidate parameter when the calculated candidate voltage error is less than the calculated reference voltage error.

9. The BMS according to claim 8, wherein the processor is further configured to generate the candidate parameter only when the calculated reference voltage error is equal to or greater than a preset reference error.

10. The BMS according to claim 8, wherein the processor is further configured, until a predetermined condition is satisfied after setting the battery parameter, to:
regenerate a candidate parameter, based on the set battery parameter and a plurality of factors arbitrarily reselected within the preset range;
recalculate a candidate voltage error, based on the regenerated candidate parameter; and
update the set battery parameter, according to a result of comparing the recalculated candidate voltage error, with a voltage error corresponding to the set battery parameter.

11. A battery pack, comprising the BMS according to claim 1.

12. A vehicle, comprising the BMS according to claim 1.

13. A battery management method, by a battery management system (BMS), including a battery parameter setting method for setting a battery parameter of an equivalent circuit model of a battery, the battery management method comprising:
a battery information obtaining operation of obtaining battery information, the battery information including voltage, current, temperature, and state of charge (SOC) of the battery according to time;
a segment classification operation of:
distinguishing the obtained battery information into a plurality of segments; and
classifying the plurality of distinguished segments;
a target temperature selection operation of selecting a target temperature section, among a plurality of preset temperature sections;
a target segment selection operation of selecting a target segment, corresponding to the target temperature section, among the plurality of classified segments;
a reference predicted value calculation operation of calculating a reference predicted value for the target segment, based on a reference parameter preset to correspond to the target segment and battery information of the target segment;
a candidate parameter generation operation of generating a candidate parameter, based on the reference parameter and a plurality of factors arbitrarily selected within a preset range;
a candidate predicted value calculation operation of calculating a candidate predicted value for the target segment, based on the candidate parameter and the battery information of the target segment;
a battery parameter setting operation of setting the battery parameter as the reference parameter or the candidate parameter, according to a result of comparing the calculated reference predicted value with the calculated candidate predicted value;
determining an estimated voltage of the battery based on the equivalent circuit model having the set battery parameter; and
monitoring a state of the battery or controlling a charge and discharge of the battery based on a state of the battery estimated according to the estimated voltage of the battery.

* * * * *